(12) United States Patent
Tiirola et al.

(10) Patent No.: US 11,743,868 B2
(45) Date of Patent: Aug. 29, 2023

(54) SHORT PHYSICAL UPLINK SHARED CHANNEL ARRANGEMENT

(71) Applicant: Nokia Technologies Oy, Espoo (FI)

(72) Inventors: Esa Tiirola, Kempele (FI); Kari Hooli, Oulu (FI); Timo Lunttila, Espoo (FI); Klaus Hugl, Vienna (AT)

(73) Assignee: NOKIA TECHNOLOGIES OY, Espoo (FI)

( * ) Notice: Subject to any disclaimer, the term of this patent is extended or adjusted under 35 U.S.C. 154(b) by 258 days.

(21) Appl. No.: 15/764,442

(22) PCT Filed: Sep. 28, 2016

(86) PCT No.: PCT/IB2016/055805
§ 371 (c)(1),
(2) Date: Mar. 29, 2018

(87) PCT Pub. No.: WO2017/056020
PCT Pub. Date: Apr. 6, 2017

(65) Prior Publication Data
US 2018/0270794 A1    Sep. 20, 2018

Related U.S. Application Data

(60) Provisional application No. 62/235,266, filed on Sep. 30, 2015.

(51) Int. Cl.
*H04W 72/04* (2023.01)
*H04L 5/00* (2006.01)

(52) U.S. Cl.
CPC ........... *H04W 72/04* (2013.01); *H04L 5/0048* (2013.01); *H04L 5/0051* (2013.01);
(Continued)

(58) Field of Classification Search
CPC .... H04W 72/04; H04L 5/0048; H04L 5/0096; H04L 5/0044
(Continued)

(56) References Cited

U.S. PATENT DOCUMENTS

2012/0082192 A1    4/2012  Pelletier et al.
2014/0029428 A1*   1/2014  Lin ..................... H04L 5/0048
                                                      370/235
(Continued)

FOREIGN PATENT DOCUMENTS

CN    104767594 A     7/2015
JP    2013-540400 A   10/2013
(Continued)

OTHER PUBLICATIONS

3GPP TSG-RAN WG2 #91; Tdoc R2-153493; Source: Ericsson; Title: Study of shorter TTI for latency reduction; Beijing, China, Aug. 24-28, 2015. (Year: 2015).*
(Continued)

*Primary Examiner* — Mohammed S Chowdhury
(74) *Attorney, Agent, or Firm* — SQUIRE PATTON BOGGS (US) LLP (57) ABSTRACT

Various communication systems may benefit from efficient communications. For example, low latency long term evolution (LTE) systems may benefit from a short physical uplink shared channel (PUSCH) arrangement. A method may include operating a user equipment to follow a shortened transmission time interval. The shortened transmission time interval can be an integer number, L, of symbols in length. The method can also include sending a demodulation reference signal in at least a first symbol of the L symbols of the shortened transmission time interval.

7 Claims, 7 Drawing Sheets

(52) U.S. Cl.
CPC .......... *H04L 5/0083* (2013.01); *H04L 5/0096* (2013.01); *H04L 5/0007* (2013.01); *H04L 5/0044* (2013.01)

(58) Field of Classification Search
USPC .......................................................... 370/329
See application file for complete search history.

(56) References Cited

U.S. PATENT DOCUMENTS

| | | | |
|---|---|---|---|
| 2014/0226607 A1 | 8/2014 | Holma et al. | |
| 2016/0095105 A1* | 3/2016 | Chen ................. | H04W 72/0413 370/329 |
| 2017/0251465 A1* | 8/2017 | Andersson ............ | H04L 5/0048 |
| 2018/0049165 A1* | 2/2018 | Byun ................ | H04W 72/0446 |
| 2018/0098337 A1* | 4/2018 | Lee .................... | H04W 72/042 |
| 2018/0199314 A1* | 7/2018 | Takeda ................. | H04W 72/04 |

FOREIGN PATENT DOCUMENTS

| | | |
|---|---|---|
| WO | 2013/041138 A1 | 3/2013 |
| WO | 2013/149664 A1 | 10/2013 |
| WO | 2014/113546 A1 | 7/2014 |

OTHER PUBLICATIONS

3GPP TSG-RAN WG2 meeting #91; R2-153514; Source: ZTE; Title: Specification impacts of short TTI; Beijing, China, Aug. 24-28, 2015. (Year: 2015).*

"3rd Generation Partnership Project; Technical Specification Group Radio Access Network; Evolved Universal Terrestrial Radio Access (E-UTRA); Physical layer procedures (Release 8)", 3GPP TS 36.213, V8.8.0, Sep. 2009, pp. 1-77.

"New SI proposal: Study on Latency Reduction Techniques for LTE", 3GPP TSG RAN Meeting #67, RP-150465, Agenda Item: 13.1.2, Ericsson, Mar. 9-12, 2015, 8 pages.

International Search Report and Written Opinion received for corresponding Patent Cooperation Treaty Application No. PCT/IB2016/055805, dated Dec. 5, 2016, 14 pages.

"Discussion on TTI Shortening", 3GPP TSG RAN WG1 Meeting #83, R1-157110, Agenda item: 6.2.9.2, ETRI, Nov. 16-20, 2015, pp. 1-7.

"Design of sPUSCH DMRS", 3GPP TSG RAN WG1 Meeting #85, R1-164234, Agenda Item: 6.2.10.1, CATT, May 23-27, 2016, 4 pages.

Japanese Office action issued in corresponding Japanese Patent Application No. 2018-516754 dated Mar. 26, 2019.

Extended European Search Report issued in corresponding European Patent Application No. 16850489.2 dated Apr. 24, 2019.

3GPP TSG-RAN WG2 #91bis, Malmö, Sweden, Oct. 5-9, 2015, "Study of Shorter TTI for Latency Reduction", Tdoc R2-154740, Agenda Item : 7.10.2, Ericsson, pp. 1-8.

Korean Office Action issued in corresponding Korean Patent Application No. 10-2018-7012040 dated Dec. 2, 2019.

Japanese Final Office Action issued in corresponding Japanese Patent Application No. 2018-516754, dated Jan. 31, 2020, with English translation thereof.

Notice of Final Rejection issued in corresponding Korean Patent Application No. 2018-7012040, dated Apr. 7, 2020, with partial English translation thereof.

Notice of Final Rejection issued in corresponding Korean Patent Application No. 2018-7012040 dated Feb. 26, 2020, with English translation thereof.

Korean Notice of Preliminary Rejection corresponding to KR Appln. No. 2020-7013104, dated Jun. 23, 2020.

Chinese Office Action corresponding to CN Appln. No. 201680069126.1, dated Jun. 29, 2020.

Sep. 25, 2020 Office Action issued in Indian Patent Application No. 201847015668 with English translation.

Communication pursuant to Article 94(3) EPC dated Feb. 16, 2021 corresponding to European Patent Application No. 16850489.2.

* cited by examiner

RELATED ART

| PRB allocations | Number of Data Symbols per TTI for S-PUSCH | | | | | |
|---|---|---|---|---|---|---|
| | 1 | 2 | 3 | 4 | 5 | 6 |
| 1 | 12 | 6 | 4 | 3 | 2.4 | 2 |
| 2 | 24 | 12 | 8 | 6 | 4.8 | 4 |
| 3 | 36 | 18 | 12 | 9 | 7.2 | 6 |
| 4 | 48 | 24 | 16 | 12 | 9.6 | 8 |
| 5 | 60 | 30 | 20 | 15 | 12 | 10 |
| 6 | 72 | 36 | 24 | 18 | 14.4 | 12 |
| 8 | 96 | 48 | 32 | 24 | 19.2 | 16 |
| 9 | 108 | 54 | 36 | 27 | 21.6 | 18 |
| 10 | | 60 | 40 | 30 | 24 | 20 |
| 12 | | 72 | 48 | 36 | 28.8 | 24 |
| 15 | | 90 | 60 | 45 | 36 | 30 |
| 16 | | 96 | 64 | 48 | 38.4 | 32 |
| 18 | | 108 | 72 | 54 | 43.2 | 36 |
| 20 | | | 80 | 60 | 48 | 40 |
| 24 | | | 96 | 72 | 57.6 | 48 |
| 25 | | | 100 | 75 | 60 | 50 |
| 27 | | | 108 | 81 | 64.8 | 54 |
| 30 | | | | 90 | 72 | 60 |
| 32 | | | | 96 | 76.8 | 64 |
| 36 | | | | 108 | 86.4 | 72 |
| 40 | | | | | 96 | 80 |
| 45 | | | | | 108 | 90 |
| 48 | | | | | | 96 |
| 50 | | | | | | 100 |
| 54 | | | | | | 108 |

Non-Supported Combination

Figure 3

| PRB allocations | Number of Data Symbols per TTI for S-PUSCH | | | | |
|---|---|---|---|---|---|
| | 1 | 2 | 3 | 4 | 5 |
| 1 | 10 | 5 | 3.333333 | 2.5 | 2 |
| 2 | 20 | 10 | 6.666667 | 5 | 4 |
| 3 | 30 | 15 | 10 | 7.5 | 6 |
| 4 | 40 | 20 | 13.33333 | 10 | 8 |
| 5 | 50 | 25 | 16.66667 | 12.5 | 10 |
| 6 | 60 | 30 | 20 | 15 | 12 |
| 8 | 80 | 40 | 26.66667 | 20 | 16 |
| 9 | 90 | 45 | 30 | 22.5 | 18 |
| 10 | 100 | 50 | 33.33333 | 25 | 20 |
| 12 | | 60 | 40 | 30 | 24 |
| 15 | | 75 | 50 | 37.5 | 30 |
| 16 | | 80 | 53.33333 | 40 | 32 |
| 18 | | 90 | 60 | 45 | 36 |
| 20 | | 100 | 66.66667 | 50 | 40 |
| 24 | | | 80 | 60 | 48 |
| 25 | | | 83.33333 | 62.5 | 50 |
| 27 | | | 90 | 67.5 | 54 |
| 30 | | | 100 | 75 | 60 |
| 32 | | | | 80 | 64 |
| 36 | | | | 90 | 72 |
| 40 | | | | 100 | 80 |
| 45 | | | | | 90 |
| 48 | | | | | 96 |
| 50 | | | | | 100 |
| 54 | | | | | 108 |

Non-Supported Combination

Figure 4

| PUSCH | |
|---|---|
| PRBs | RE/TTI |
| 1 | 144 |
| 2 | 288 |
| 3 | 432 |
| 4 | 576 |
| 5 | 720 |
| 6 | 864 |
| 8 | 1152 |
| 9 | 1296 |
| 10 | 1440 |
| 12 | 1728 |
| 15 | 2160 |
| 16 | 2304 |
| 18 | 2592 |
| 20 | 2880 |
| 24 | 3456 |
| 25 | 3600 |
| 27 | 3888 |
| 30 | 4320 |
| 32 | 4608 |
| 36 | 5184 |
| 40 | 5760 |
| 45 | 6480 |
| 48 | 6912 |
| 50 | 7200 |

S-PUSCH

| PRBs | RE/TTI with different number of data symbols per TTI for S-PUSCH | | | | | |
|---|---|---|---|---|---|---|
| | 1 | 2 | 3 | 4 | 5 | 6 |
| 1 | 12 | 24 | 36 | 48 | 60 | 72 |
| 2 | 24 | 48 | 72 | 96 | 120 | 144 |
| 3 | 36 | 72 | 108 | 144 | 180 | 216 |
| 4 | 48 | 96 | 144 | 192 | 240 | 288 |
| 5 | 60 | 120 | 180 | 240 | 300 | 360 |
| 6 | 72 | 144 | 216 | 288 | 360 | 432 |
| 8 | 96 | 192 | 288 | 384 | 480 | 576 |
| 9 | 108 | 216 | 324 | 432 | 540 | 648 |
| 10 | 120 | 240 | 360 | 480 | 600 | 720 |
| 12 | 144 | 288 | 432 | 576 | 720 | 864 |
| 15 | 180 | 360 | 540 | 720 | 900 | 1080 |
| 16 | 192 | 384 | 576 | 768 | 960 | 1152 |
| 18 | 216 | 432 | 648 | 864 | 1080 | 1296 |
| 20 | 240 | 480 | 720 | 960 | 1200 | 1440 |
| 24 | 288 | 576 | 864 | 1152 | 1440 | 1728 |
| 25 | 300 | 600 | 900 | 1200 | 1500 | 1800 |
| 27 | 324 | 648 | 972 | 1296 | 1620 | 1944 |
| 30 | 360 | 720 | 1080 | 1440 | 1800 | 2160 |
| 32 | 384 | 768 | 1152 | 1536 | 1920 | 2304 |
| 36 | 432 | 864 | 1296 | 1728 | 2160 | 2592 |
| 40 | 480 | 960 | 1440 | 1920 | 2400 | 2880 |
| 45 | 540 | 1080 | 1620 | 2160 | 2700 | 3240 |
| 48 | 576 | 1152 | 1728 | 2304 | 2880 | 3456 |
| 50 | 600 | 1200 | 1800 | 2400 | 3000 | 3600 |
| 54 | 648 | 1296 | 1944 | 2592 | 3240 | 3888 |
| 60 | 720 | 1440 | 2160 | 2880 | 3600 | 4320 |
| 64 | 768 | 1536 | 2304 | 3072 | 3840 | 4608 |
| 72 | 864 | 1728 | 2592 | 3456 | 4320 | 5184 |
| 75 | 900 | 1800 | 2700 | 3600 | 4500 | 5400 |
| 80 | 960 | 1920 | 2880 | 3840 | 4800 | 5760 |
| 81 | 972 | 1944 | 2916 | 3888 | 4860 | 5832 |
| 90 | 1080 | 2160 | 3240 | 4320 | 5400 | 6480 |
| 96 | 1152 | 2304 | 3456 | 4608 | 5760 | 6912 |
| 100 | 1200 | 2400 | 3600 | 4800 | 6000 | 7200 |

SHORT PHYSICAL UPLINK SHARED CHANNEL ARRANGEMENT

RELATED APPLICATION

This application was originally filed as Patent Cooperation Treaty Application No. PCT/IB2016/055805 filed Sep. 28, 2016 which claims priority benefit to U.S. Provisional Patent Application No. 62/235,266, filed Sep. 30, 2015.

BACKGROUND

Field

Various communication systems may benefit from efficient communications. For example, low latency long term evolution (LTE) systems may benefit from a short physical uplink shared channel (PUSCH) arrangement.

Description of the Related Art

Uplink latency, particularly user plane (U-plane) latency, is built into LTE systems. Building blocks of the uplink latency components include fixed transmission time interval (TTI) length of 1 ms, predefined PUSCH scheduling timing, including physical hybrid automatic repeat request (HARQ) indicator channel (PHICH) HARQ acknowledgment (HARQ-ACK) timing, and fixed HARQ re-transmission timing due to synchronous HARQ with a predefined number of HARQ processes. LTE latency components are illustrated in Table 1. Specifically, Table 1 illustrates U-plane latency analysis for frequency division duplex (FDD) & time division duplex (TDD) in uplink (UL) with 10% block error rate (BLER).

TABLE 1

Latency components in LTE UL.

| Delay Component | LTE-A FDD | LTE-A TDD |
| --- | --- | --- |
| UE Processing | 1.5 ms | 1 ms |
| Frame Alignment |  | 1.1-5 ms |
| TTI duration | 1 ms | 1 ms |
| eNB Processing | 1.5 ms | 1.5 ms |
| HARQ Re-transmission (10% × HARQ RTT) | 0.8 ms | 1.0-1.16 ms |
| Total Delay | 4.8 ms | 5.8-9.5 ms |

Figure 1:
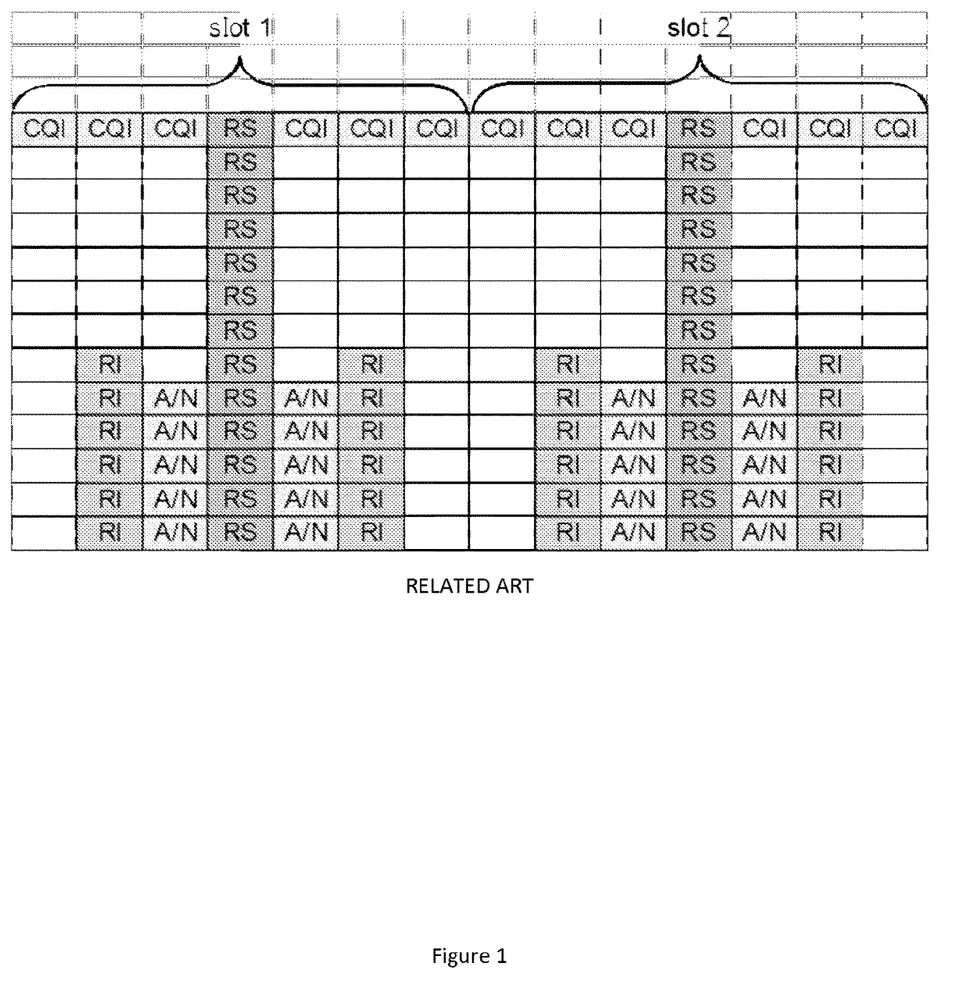
FIG. 1 illustrates PUSCH multiplexing design.

LTE Release 8 included a PUSCH multiplexing design between PUSCH data, reference signal (RS) and different uplink control signals, HARQ-ACK (A/N), Rank Indicator (RI) and Channel Quality Indicator (CQI). FIG. 1 illustrates PUSCH multiplexing design. As shown in FIG. 1, the design can include PUSCH data (white boxes), CQI, RI and HARQ-ACK resource mapping in LTE.

SUMMARY

According to a first embodiment, a method may include operating a user equipment to follow a shortened transmission time interval. The shortened transmission time interval can be an integer number, L, of symbols in length. The method can also include sending a demodulation reference signal in at least a first symbol of the L symbols of the shortened transmission time interval. Alternatively, or in addition, the method can include adapting a bandwidth of a shortened physical uplink shared channel in accordance with the shortened transmission time interval. This adapting can involve, for the user equipment, using a different amount of bandwidth under different circumstances.

In a variant, the method can also include receiving a dynamic indication to drop at least one demodulation reference signal in a subsequent transmission. The method can further include dropping the at least one demodulation reference signal based on the indication.

In a variant, the method can also include dropping the at least demodulation reference signal based on rules.

In a variant, the rules are known in advance by the user equipment and are configured to the user equipment by a network, specification, or manufacturer.

In variant, the method can further include receiving dynamic signalling to operate in conjunction with or in supplement to the rules.

In a variant, an allowed bandwidth of the shortened transmission time interval can be configured to align a number of resource elements for shortened physical uplink shared channel data with a number of resource elements for legacy physical uplink shared channel data.

In a variant, when $X(i)$ is a valid bandwidth option for PUSCH, the corresponding bandwidth option for S-PUSCH, denoted as $Y(i)$, can be obtained as $$Y(i) = \frac{X(i) * M}{K},$$

where the following is true: M equals to the number of SC-FDMA data symbols for PUSCH in a legacy system, such as legacy LTE (M=12 in the case of normal CP length and 10 in the case of extended CP length, respectively); K equals to the number of data symbols for S-PUSCH; and i=index of valid channel bandwidth option for PUSCH.

In a variant, a number of data symbols per subframe can vary dynamically.

In a variant, the dynamic variation can be based on whether at least one of a sounding reference signal or a demodulation reference signal is to be present in a given subframe.

According to a second embodiment, a method may include operating an access node to follow a shortened transmission time interval. The shortened transmission time interval can be an integer number, L, of symbols in length. The method can also include receiving a demodulation reference signal in at least a first symbol of the L symbols of the shortened transmission time interval. Alternatively, or in addition, the method can include receiving a shortened physical uplink shared channel, wherein the receiving comprises adapting a bandwidth on which a shortened physical uplink shared channel is received in accordance with the shortened transmission time interval. This adapting can involve, for the access node, allocating a different amount of bandwidth under different circumstances.

In a variant, the method can further include sending a dynamic indication for a user equipment to drop at least one demodulation reference signal in a subsequent transmission.

In a variant, the method can further include sending a configuration of a rule on dropping at least one demodulation reference signal in a subsequent transmission for a user equipment.

In variant, the method can further include sending a dynamic indication to operate in conjunction with or in supplement to the dropping rule.

In a variant, the sending can be based on a decision by a scheduler to reduce reference signal overhead.

In a variant, an allowed bandwidth of the shortened transmission time interval can be configured to align a number of resource elements for shortened physical uplink shared channel data with a number of resource elements for legacy physical uplink shared channel data.

In a variant, when X(i) is a valid bandwidth option for PUSCH, the corresponding bandwidth option for S-PUSCH, denoted as Y(i), can be obtained as $$Y(i) = \frac{X(i) * M}{K},$$

where the following is true: M equals to the number of SC-FDMA data symbols for PUSCH in a legacy system, such as legacy LTE (M=12 in the case of normal CP length and 10 in the case of extended CP length, respectively); K equals to the number of data symbols for S-PUSCH; and i=index of valid channel bandwidth option for PUSCH.

In a variant, a number of data symbols per subframe can vary dynamically.

The dynamic variation can be based on whether at least one of a sounding reference signal or a demodulation reference signal is to be present in a given subframe.

According to third and fourth embodiments, an apparatus can include means for performing the method according to the first and second embodiments respectively, in any of their variants.

According to fifth and sixth embodiments, an apparatus can include at least one processor and at least one memory and computer program code. The at least one memory and the computer program code can be configured to, with the at least one processor, cause the apparatus at least to perform the method according to the first and second embodiments respectively, in any of their variants.

According to seventh and eighth embodiments, a computer program product may encode instructions for performing a process including the method according to the first and second embodiments respectively, in any of their variants.

According to ninth and tenth embodiments, a non-transitory computer readable medium may encode instructions that, when executed in hardware, perform a process including the method according to the first and second embodiments respectively, in any of their variants.

According to eleventh and twelfth embodiments, a system may include at least one apparatus according to the third or fifth embodiments in communication with at least one apparatus according to the fourth or sixth embodiments, respectively in any of their variants.

BRIEF DESCRIPTION OF THE DRAWINGS

For proper understanding of the invention, reference should be made to the accompanying drawings, wherein.

DETAILED DESCRIPTION

Certain embodiments relate to long term evolution (LTE) changes with respect to reduced air interface latency, which may be part of LTE release (Rel) 13/14. For example, certain embodiments relate to the design of physical uplink shared (PUSCH) for UEs configured to operate in low-latency configuration.

TTI shortening and reduced processing times may involve TTI lengths between one OFDM symbol and 0.5 ms, taking into account impact on reference signals and physical layer control signaling. Moreover, it may be desirable that backwards compatibility be preserved, thus allowing normal operation of pre-Rel 13 UEs on the same carrier.

Certain embodiments define a framework for shortened PUSCH (S-PUSCH) resource allocation, such that the current signaling framework can be maximally utilized, while signaling overhead as well as spectrum fragmentation can be controlled.

In view of Table 1, in order to improve latency performance in LTE, several issues can be addressed: TTI length can be reduced, eNB/UE processing times can be shortened when processing PUSCH and related HARQ-ACK/UL grant in both ends of the radio link, and HARQ re-transmissions can be accelerated.

Thus, certain embodiments address how to define a framework for S-PUSCH resource allocation given the following: there may be legacy LTE UEs operating in the same carrier; down-scaling the entire radio physical layer in time, including numerology and the like, may not be possible due to backwards compatibility requirement; it may be valuable to maximize the current building blocks, such as reference signal design as well as control/data multiplexing within a TTI; and it may be valuable to ensure sufficient coverage within existing cell area while keeping RS overhead at acceptable level.

Certain embodiments, therefore, may support TTI lengths ranging from one OFDM symbol up to 1 slot (0.5 ms), may support multiplexing with sounding reference signal (SRS), may maximize possibilities for pipeline processing at eNB receiver, may also support also MU-MIMO pairing, and may maintain low cubic metric properties of the transmitted signal.

Figure 2:
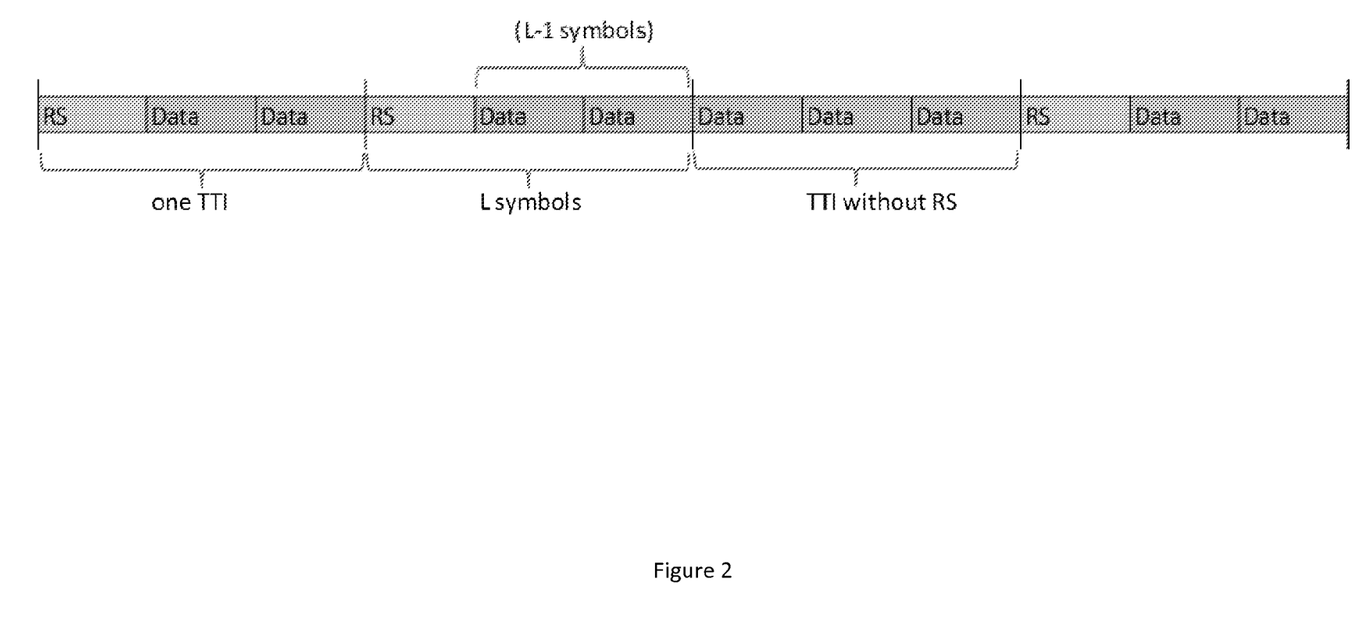
FIG. 2 illustrates a structure of a shortened physical uplink shared channel, according to certain embodiments.

FIG. 2 illustrates a structure of a shortened physical uplink shared channel, according to certain embodiments. The structure can include various characteristics. For example, the structure can include a shortened TTI (S-TTI) length set to be L symbols. L can be a configuration parameter or a predetermined parameter. Thus, in certain embodiments L may be set by a node, such as an evolved Node B (eNB) or may be configured for the entire system.

A first symbol of S-TTI can be made available for the demodulation reference signal (DM-RS). The availability of this reference signal may allow pipeline processing at an eNB. For example, an eNB can make channel estimation right after receiving the first data symbol, such as the first single carrier frequency division multiple access (SC-FDMA) symbol. The first symbol of S-TTI is one example of the location that can be made available for a reference signal, such as DM-RS. Other locations are also permitted, such as a last symbol of S-TTI or any other fixed location within S-TTI.

Additionally, an eNB may be able to dynamically indicate to the UE to drop the DM-RS symbol from certain S-TTI and replace it by UL data. For example, the eNB may make this dynamic indication when eNB schedules several S-TTIs for a certain UE and with the same frequency allocation.

This replacement may allow reduction of RS overhead. Alternatively, coverage may be improved at price of higher RS overhead and lower throughput. RS overhead reduction can be made dynamically based on eNB scheduler decision.

The allowed bandwidth options for S-PUSCH can be defined such that the number of resource elements for S-PUSCH Data in S-TTI, and thereby the UL transport block sizes, are aligned with the number of resource elements for PUSCH Data in a 1-millisecond TTI of legacy LTE. This may help to provide commonality with LTE.

The alignment can involve various aspects. For example, bandwidth options supported by current LTE PUSCH can form a candidate set (denoted as X) for S-PUSCH. Thus, the number of resource elements (REs) per SC-FDMA data symbol, corresponding to the number of physical resource blocks (PRBs) allocated×12, can be set to be factorized into a small number of prime numbers 2, 3 and 5, which in turn can facilitate efficient DFT implementation. This approach can also ensure that S-PUSCH can be realized with current RS sequences.

If X(i) is a valid bandwidth option for PUSCH, the corresponding bandwidth option for S-PUSCH, denoted as Y(i), can be obtained as $$Y(i) = \frac{X(i) * M}{K},$$

where the following is true: M equals to the number of SC-FDMA data symbols for PUSCH in a legacy system, such as legacy LTE (M=12 in the case of normal CP length and 10 in the case of extended CP length, respectively); K equals to the number of data symbols for S-PUSCH; and i=index of valid channel bandwidth option for PUSCH. The number of valid bandwidth options for S-PUSCH may thus be reduced compared to the case of PUSCH. It is possible to take this reduction into account when defining resource allocation signaling for S-PUSCH. Resource allocation size can scale accordingly.

The parameter K can, in certain embodiments, vary dynamically according to number of SC-FDMA data symbols per subframe. For example, it may be L symbols in an S-TTI without SRS and DM-RS, L-1 symbols in an S-TTI including either DM-RS or SRS or L-2 symbols in an S-TTI with DM-RS and SRS.

Dynamic variation of K can ensure that the presence of SRS does not reduce the transport block sizes for S-PUSCH. In the case when S-PUSCH collides with an SRS symbol, the corresponding symbol may need to be dropped. Dynamic variation can also ensure that DM-RS dropping, controlled by the eNB, does not increase transport block size.

Varying resource size may be a part of S-PUSCH operation, for example, due to SRS. This varying resource size may benefit from asynchronous HARQ operation.

The UE may derive the parameter K implicitly and interpret the S-PUSCH resource allocation accordingly. For example, the resource allocation granularity in terms of contiguously allocated resource blocks may depend on parameter K.

Figure 3:
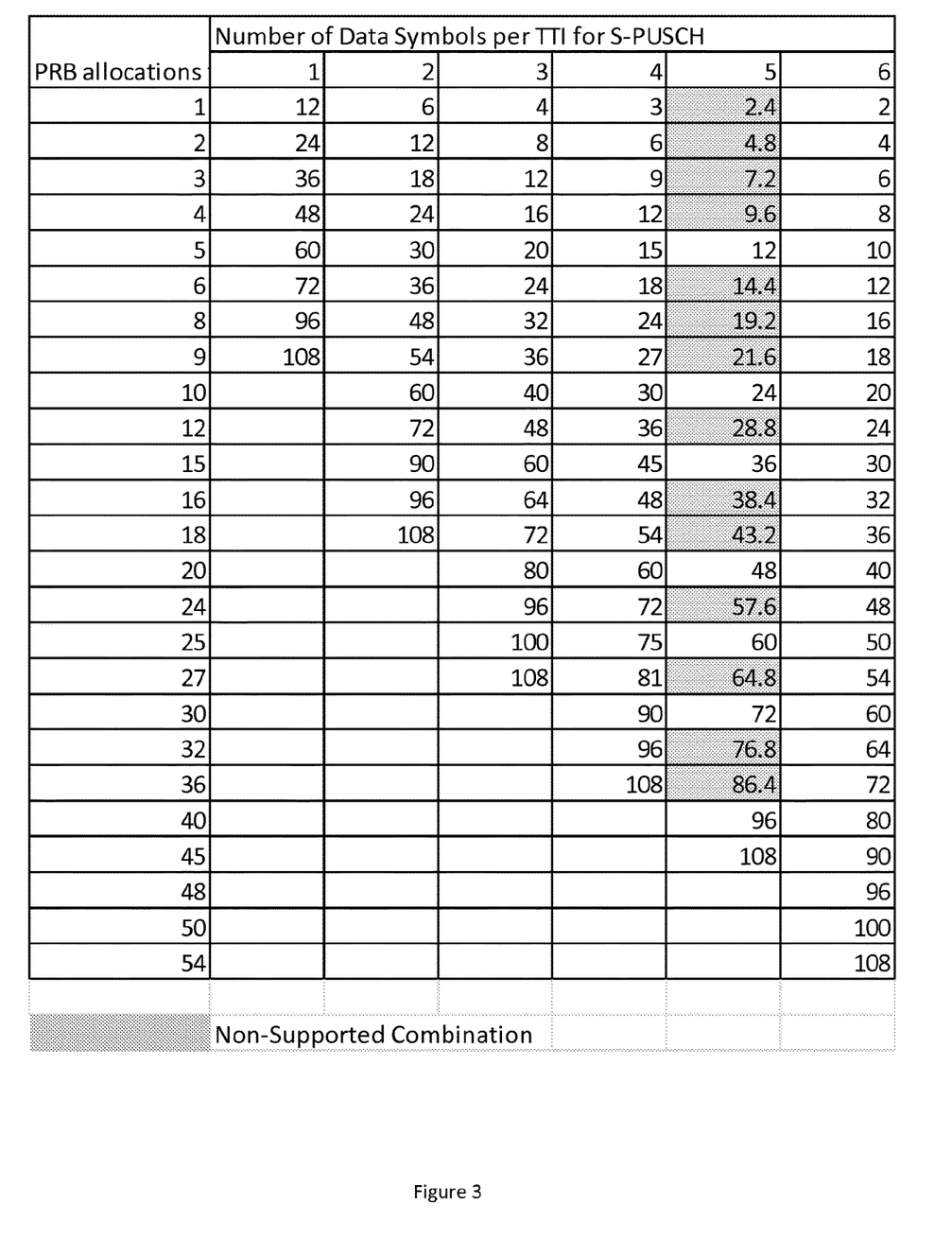
FIG. 3 illustrates the number of PRBs available for S-PUSCH with normal CP length, according to certain embodiments.
Figure 4:
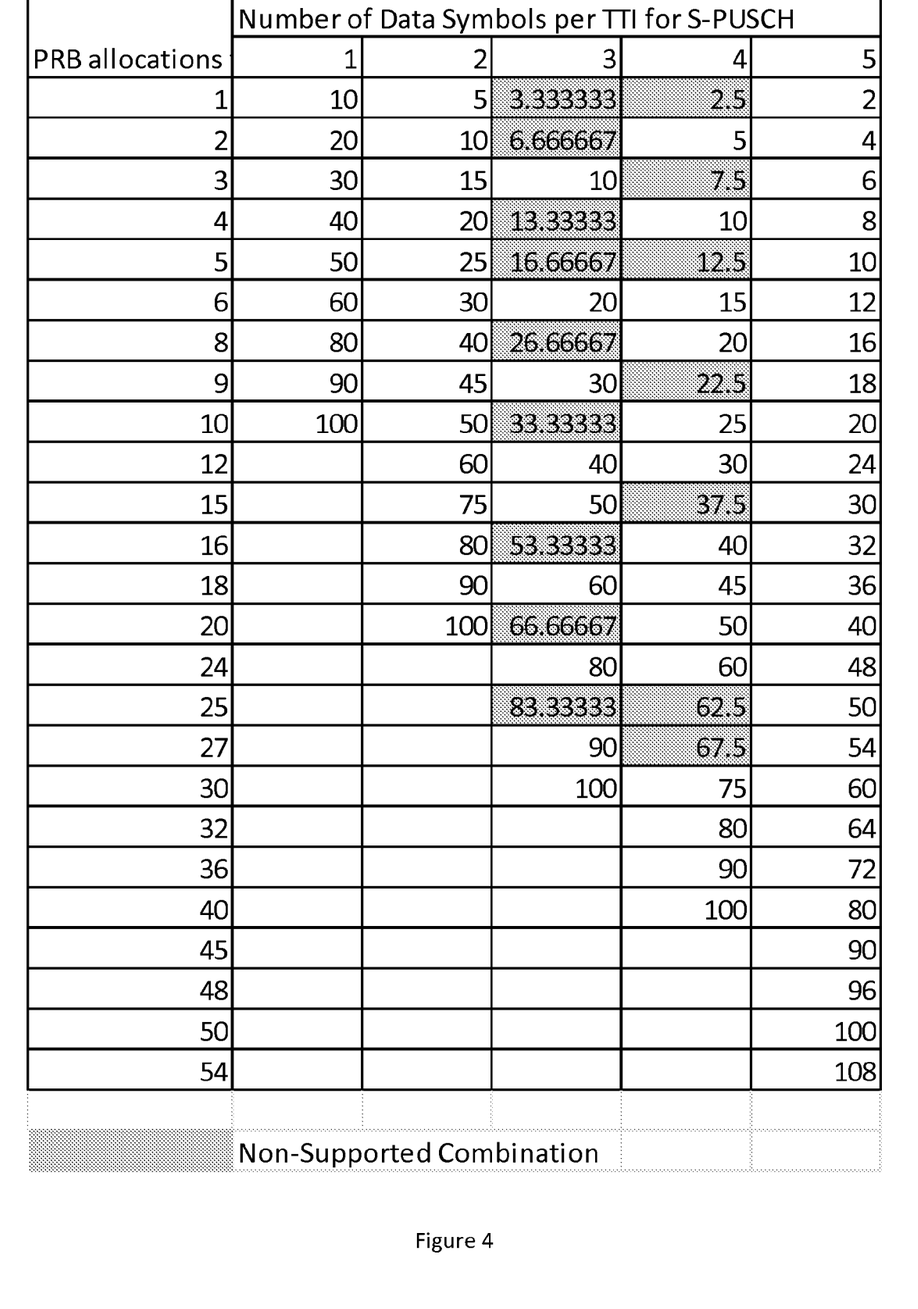
FIG. 4 illustrates the number of PRBs available for S-PUSCH with extended CP length, according to certain embodiments.
Figure 5:
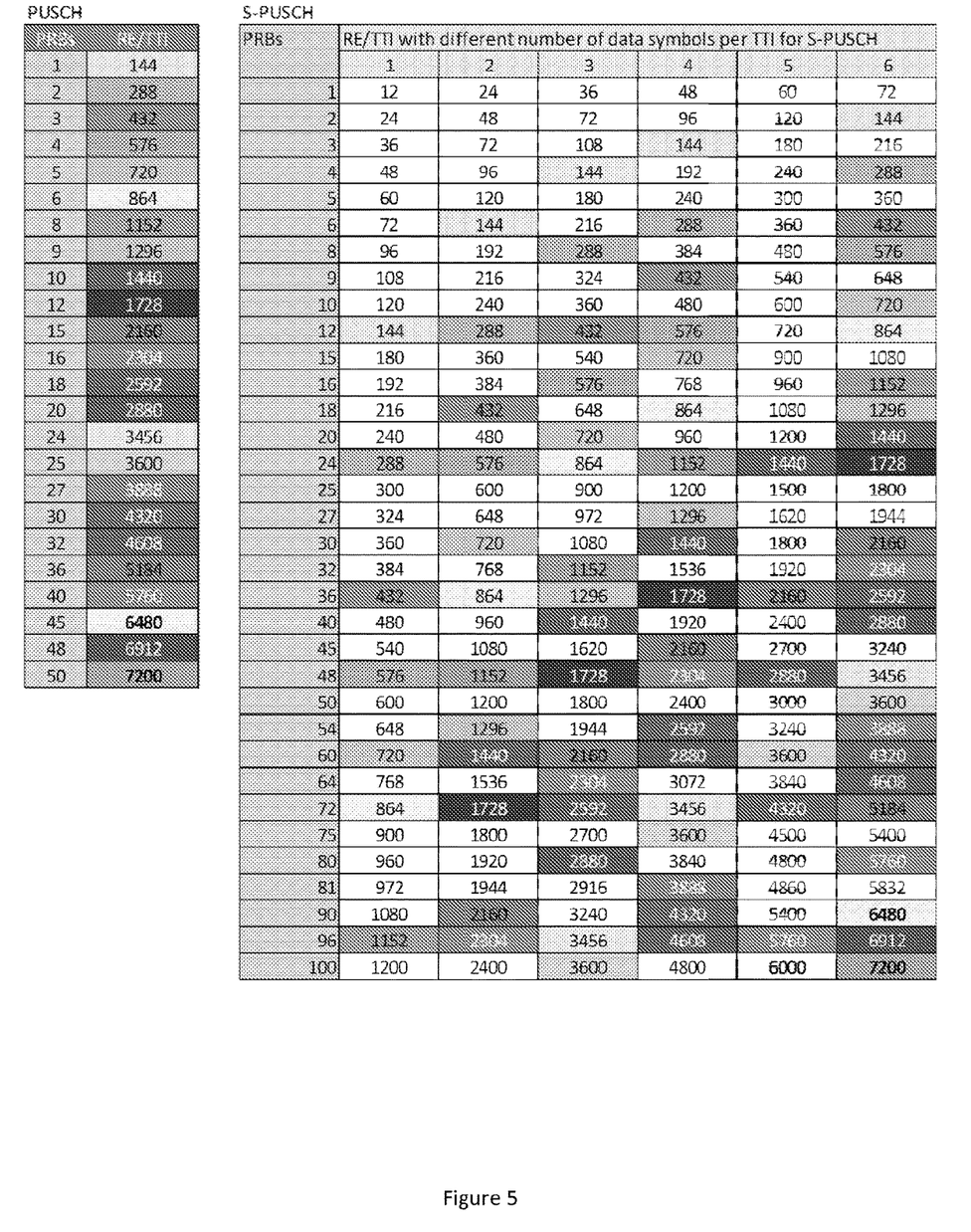
FIG. 5 illustrates the number of resource elements with normal CP length, according to certain embodiments.

The number of PRBs available for S-PUSCH has been illustrated in FIGS. 3 and 4. Specifically, FIG. 3 illustrates the number of PRBs available for S-PUSCH with normal CP length (M=12), according to certain embodiments, while FIG. 4 illustrates the number of PRBs available for S-PUSCH with extended CP length (M=10), according to certain embodiments. FIG. 5 illustrates the number of resource elements with normal CP length, according to certain embodiments.

Thus, FIG. 3 illustrates supported bandwidth allocations, in terms of number of PRBs, for S-PUSCH for given number of data symbols per TTI, normal CP length. FIG. 4 illustrates supported bandwidth allocations, in terms of number of PRBs, for S-PUSCH for given number of data symbols per TTI, extended CP length. Finally, FIG. 5 illustrates number of resource elements per TTI for PUSCH and S-PUSCH for normal CP length (M=12). As shown in these figures, some allocations may be un-supported because they result in non-integer numbers of data symbols. Furthermore, only a subset of allocations may be backward compatible from S-PUSCH to PUSCH. The backward compatibility may relate to at least the one of the following features: reuse of PUSCH reference signal sequences for S-PUSCH and reuse of transport block sizes defined for PUSCH for S-PUSCH.

Valid bandwidth options for S-PUSCH can be variously characterized. For example, certain combinations of X(i), M and K may result in non-integer values for Y(i), as indicated in FIG. 3 and FIG. 4. Non-supported bandwidth options exist with K=5, for normal CP length, and K=[3, 4], for extended CP length.

Those bandwidth options may be excluded from the set of legal bandwidth options available for S-PUSCH. The same applies to bandwidth options exceeding the nominal channel bandwidth, for example 20 MHz/100 PRBs. Another option for handling non-integer values of Y(i) may be to apply round, ceil or floor functions in a predetermined way and in such a way that the achieved bandwidth allocation for S-PUSCH belongs to the candidate set X, namely a part of the current bandwidth options available for PUSCH.

A DM-RS dropping operation, as mentioned above, can be controlled by an access node, such as an eNB. At least two baseline operation modes may be applied here. According to a first baseline operation mode, there can be dynamic indication of DM-RS dropping based on an indication in the UL grant. In this case the eNB can inform the UE in the UL grant that DM-RS is to be dropped and the DM-RS symbol is to be used for S-PUSCH data REs.

According to a second baseline operation mode, there can be higher layer configuration of DM-RS dropping rules. In this case, there may be no need for dynamic indication in the UL grant. Instead, rules can inform the devices of the system as to when DM-RS dropping is to occur. These rules can be higher layer configured to the UE. The rules may include, for example, that a UE has been scheduled in a previous S-TTI with the same, or subset of the previous, resource allocation. Therefore, repeating the same DM-RS on previously occupied PRBs may not be needed. Additional rules might include a minimum periodicity. The minimum periodicity may be a time when DM-RS independent of the allocation nevertheless would need to be transmitted, for example the first scheduled S-TTI within a legacy 1 ms TTI. Alternatively, the rules may specify a maximum number of S-TTIs that can be operated without the need to re-transmit the DM-RS.

Resource allocation is defined by 3GPP technical specification (TS) 36.213 in the following way (Rel-8), at section 81, "Resource Allocation for PDCCH DCI Format 0":

The resource allocation information indicates to a scheduled UE a set of contiguously allocated virtual resource block indices denoted by $n_{VRB}$. A resource allocation field in the scheduling grant consists of a resource indication value (RIV) corresponding to a starting resource block ($RB_{START}$) and a length in terms of contiguously allocated resource blocks ($L_{CRBs} \geq 1$). The resource indication value is defined by if $(L_{CRBs}-1) \leq \lfloor N_{RB}^{UL}/2 \rfloor$ then $RIV = N_{RB}^{UL}(L_{CRBs}-1) + RB_{START}$ else $RIV = N_{RB}^{UL}(N_{RB}^{UL} - L_{CRBs}+1) + (N_{RB}^{UL} - 1 - RB_{START})$ A UE shall discard PUSCH resource allocation in the corresponding PDCCH with DCI format 0 if consistent control information is not detected.

An option to define resource allocation for S-PUSCH according to certain embodiments can include the following. The resource allocation signalling and the interpretation of $RB_{START}$ may remain unchanged. S-PUSCH resource allocation can interpret parameter $$L_{CRBs} \text{ as } \frac{L_{CRBs} * M}{K}.$$

The number of bits reserved for resource block assignment on S-PUSCH scheduling grant can be reduced by taking account the maximum value that contiguously allocated resource blocks $L_{CRBs}$ can take with K=L. In other words, it can be taken into account that $L_{CRBs} \leq N_{RB}^{UL} L/M$. The size of resource block assignment field for S-PUSCH may not vary between subframes.

Another option can be that the S-PUSCH resource allocation can interpret parameter $L_{CRBs}$ as in the current resource allocation scheme. Instead, the eNB can take the limitations defined by $$\frac{X(i) * M}{K}$$

into account when determining the $L_{CRBs}$ value to be signalled to UE. If UE receives S-PUCH resource allocation with invalid parameter $L_{CRBs}$, it may ignore those allocations.

Transport block size can be determined mostly according to the current TBS determination procedure. In other words, $I_{TBS}$ can be determined based on a modulation and coding scheme index signalled on the S-PUSCH scheduling grant. Also current transport block size tables, as defined in 3GPP TS 36.213, Section 7.1.7.2, can be used. However, TB size can be given by the ($I_{TBS}$, $N_{PRB}$ K/M) entry of TB size table, instead of current ($I_{TBS}$, $N_{PRB}$) entry, where $N_{PRB}$ is the number of allocated PRBs.

LTE supports uplink Multi-User—MIMO in a way that eNB can dynamically assign orthogonal cyclic shifts to UEs occupying the same frequency resources within a cell or CoMP collaboration area. This property can also be maintained with S-PUSCH. The eNB may need to guarantee the DM-RS on the same TTIs for the involved UEs.

Cyclic shift separation can also be applied to provide orthogonal reference signals for different antenna ports of UL single user MIMO with the same principles and signalling as in previous releases.

Configuration signalling can include a variety of aspects. For example, initial access can be based on legacy operation. S-PUSCH can be configured to a UE via higher layer configuration. Configuration may involve all needed parameters such as the following: S-TTI length, for example L symbols (this may instead be preconfigured); reference number of PUSCH data symbols K {10,12}; whether support for DM-RS dropping is enabled/disabled; and S-PUSCH-specific parameters for uplink control information (UCI) transmission.

As mentioned above, instead of being dynamically signalled, DM-RS dropping can be configured by rules that can be known in advance by the UE. These rules may be configured to the UE by the network or specification or manufacturer or by any other desired way.

In certain embodiments, the eNB may be able to select dynamically between S-PUSCH and PUSCH, when performing uplink scheduling. Triggering may be done with the same UL grant, such as DCI 0. There can be, for example, one bit or a specific signalling state triggering S-PUSCH.

Triggering may be happening from different DL control channel regions. For example, PUSCH may be triggered from legacy TTI (1 ms) (E)PDCCH only, whereas S-PUSCH may be triggered from S-TTI DL control region only. A shorter S-TTI control region may enable fast S-PUSCH triggering not related to the 1 ms periodicity of legacy TTI length control channel operation.

Figure 6:
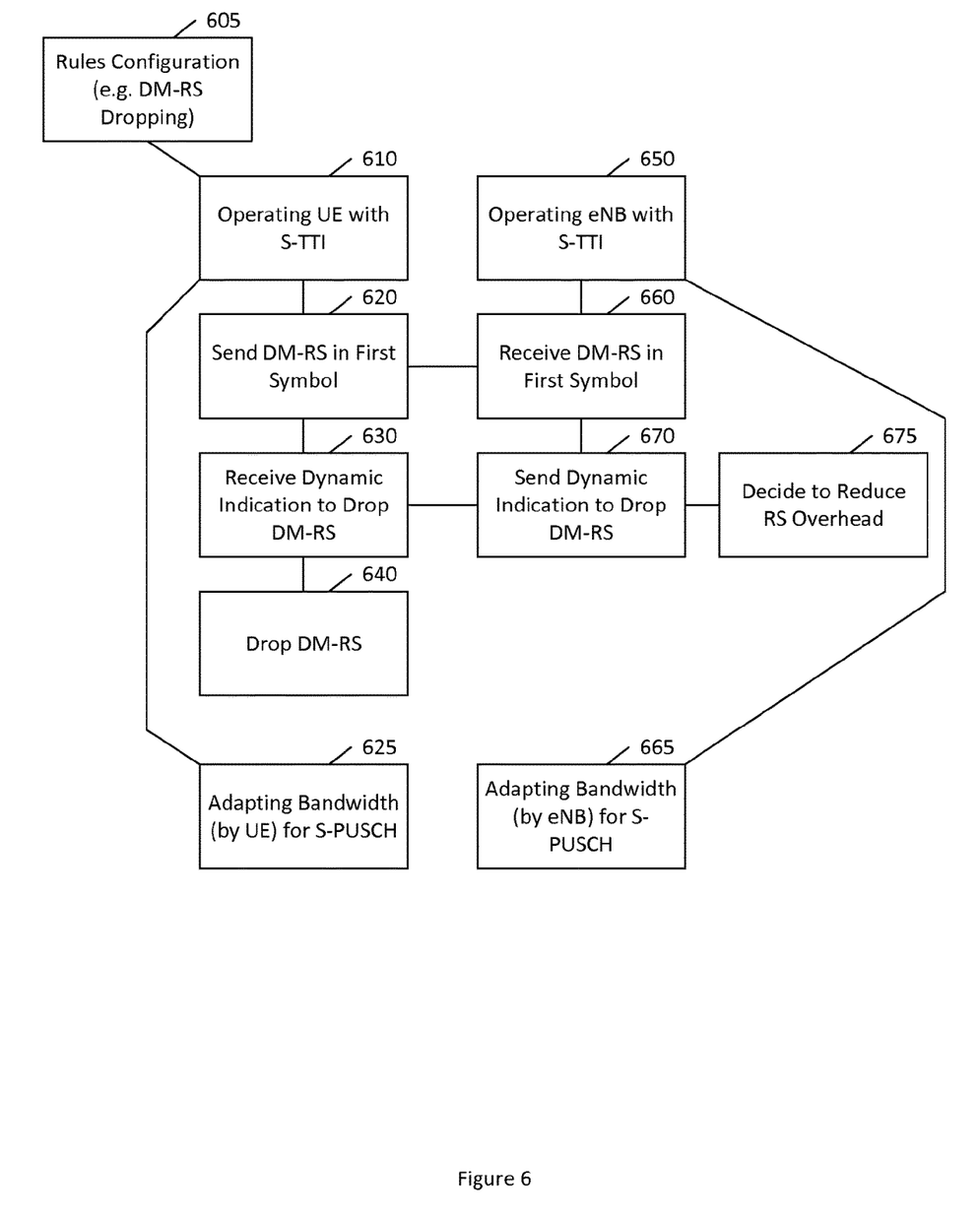
FIG. 6 illustrates a method according to certain embodiments.

FIG. 6 illustrates a method according to certain embodiments. As shown in FIG. 6, the method can include, at 610, operating a user equipment to follow a shortened transmission time interval. The shortened transmission time interval can be an integer number, L, of symbols in length. The method can also include, at 620, sending a demodulation reference signal in at least a first symbol of the L symbols of the shortened transmission time interval.

The method can further include, at 630, receiving a dynamic indication to drop at least one demodulation reference signal in a transmission, for example a subsequent transmission. The method can additionally include, at 640, dropping the at least one demodulation reference signal based on the indication.

Alternatively, instead of being dynamically signalled, DM-RS dropping can be configured at 605 by rules that can be known in advance by the UE. These rules may be configured to the UE by the network or specification or manufacturer or by any other desired way. Other rules can also be configured to the UE at 605. In certain embodiments, the dynamic signalling at 630 can operate in conjunction with or in supplement to the rules configured at 605.

An allowed bandwidth of the shortened transmission time interval can be configured to align a number of resource elements for shortened physical uplink shared channel data with a number of resource elements for legacy physical uplink shared channel data. Ways of ensuring such alignment are discussed above and illustrated in FIGS. 3 through 5.

A number of data symbols per subframe can vary dynamically. The dynamic variation can be based on whether at least one of a sounding reference signal or a demodulation reference signal is to be present in a given subframe.

In addition to, or as an alternative to the above-described features, at 625 the method can include adapting a bandwidth for S-PUSCH. This adapting can involve, for the user equipment, using a different amount of bandwidth under different circumstances. The various circumstances are described above.

The features described at 610 to 640 may be performed by a device such as a user equipment (UE). Additional features may be performed by a device such as an access node, for example, an eNB.

For example, the method can include, at 650, operating an access node to follow the above-mentioned shortened transmission time interval. The method can also include, at 660, receiving a demodulation reference signal in at least a first symbol of the L symbols of the shortened transmission time interval. This can be the same demodulation reference signal sent at 620.

The method can further include, at 670, sending a dynamic indication for a user equipment to drop at least one demodulation reference signal in a transmission, for example a subsequent transmission. This can be the same dynamic indication received at 630. The sending can be based on a decision, at 675, by a scheduler to reduce reference signal overhead.

In addition to, or as an alternative to the above-described features, at 665 the method can include adapting a bandwidth for S-PUSCH. This adapting can involve, for the access node such as an eNB, allocating a different amount of bandwidth under different circumstances. The various circumstances are described above.

Figure 7:
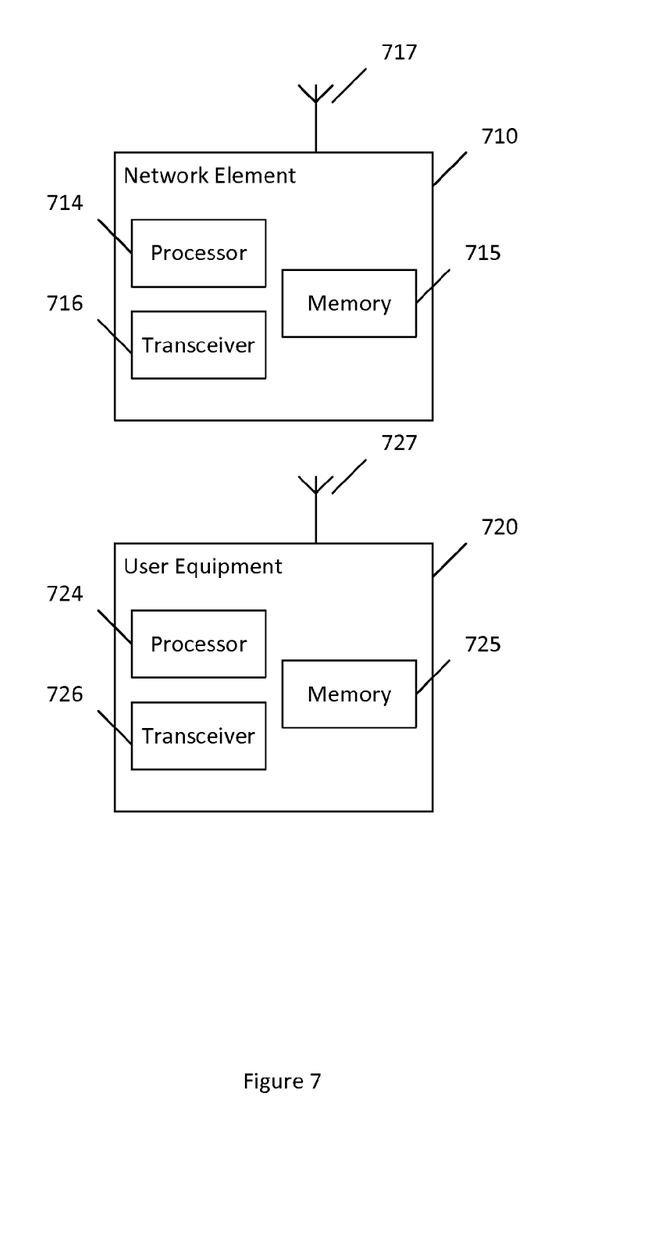
FIG. 7 illustrates a system according to certain embodiments.

FIG. 7 illustrates a system according to certain embodiments of the invention. It should be understood that each block of the flowchart of FIG. 6 may be implemented by various means or their combinations, such as hardware, software, firmware, one or more processors and/or circuitry. In one embodiment, a system may include several devices, such as, for example, network element 710 and user equipment (UE) or user device 720. The system may include more than one UE 720 and more than one network element 710, although only one of each is shown for the purposes of illustration. A network element can be an access point, a base station, an eNode B (eNB), or any other network element.

Each of these devices may include at least one processor or control unit or module, respectively indicated as 714 and 724. At least one memory may be provided in each device, and indicated as 715 and 725, respectively. The memory may include computer program instructions or computer code contained therein, for example for carrying out the embodiments described above. One or more transceiver 716 and 726 may be provided, and each device may also include an antenna, respectively illustrated as 717 and 727. Although only one antenna each is shown, many antennas and multiple antenna elements may be provided to each of the devices. Other configurations of these devices, for example, may be provided. For example, network element 710 and UE 720 may be additionally configured for wired communication, in addition to wireless communication, and in such a case antennas 717 and 727 may illustrate any form of communication hardware, without being limited to merely an antenna.

Transceivers 716 and 726 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. It should also be appreciated that according to the "liquid" or flexible radio concept, the operations and functionalities may be performed in different entities, such as nodes, hosts or servers, in a flexible manner. In other words, division of labor may vary case by case. One possible use is to make a network element to deliver local content. One or more functionalities may also be implemented as a virtual application that is provided as software that can run on a server.

A user device or user equipment 720 may be a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof. The user device or user equipment 720 may be a sensor or smart meter, or other device that may usually be configured for a single location.

In an exemplifying embodiment, an apparatus, such as a node or user device, may include means for carrying out embodiments described above in relation to FIG. 6.

Processors 714 and 724 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors. Additionally, the processors may be implemented as a pool of processors in a local configuration, in a cloud configuration, or in a combination thereof.

For firmware or software, the implementation may include modules or unit of at least one chip set (e.g., procedures, functions, and so on). Memories 715 and 725 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network element 710 and/or UE 720, to perform any of the processes described above (see, for example, FIG. 6). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments of the invention may be performed entirely in hardware.

Furthermore, although FIG. 7 illustrates a system including a network element 710 and a UE 720, embodiments of the invention may be applicable to other configurations, and configurations involving additional elements, as illustrated and discussed herein. For example, multiple user equipment devices and multiple network elements may be present, or other nodes providing similar functionality, such as nodes that combine the functionality of a user equipment and an access point, such as a relay node.

Certain embodiments may have various benefits and/or advantages. For example, in certain embodiments there may be no need for new RS sequences. Furthermore, in certain embodiments, single carrier properties can be maintained, with low cubic metric properties of the transmitted signal. Additionally, in certain embodiments spectrum fragmentation can be minimized.

Moreover, in certain embodiments relative DCI overhead may be at a reasonable level, since smallest PRB allocations may not be supported for short TTI lengths. Furthermore, certain embodiments may maximize possibilities for pipeline processing at eNB receiver.

Certain embodiments may also support MU-MIMO pairing. Likewise, certain embodiments may provide scalable RS overhead, facilitating tradeoff between coverage and RS overhead. Certain embodiments may maintain same UL transport block size (TBS) sizes compared to legacy operation, which may enable retransmission at different TTI lengths on the same carrier for a single UE.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

List of Abbreviations
3GPP Third Generation Partnership Program
CA Carrier Aggregation
CC Component Carrier
CQI Channel Quality Indicator
CRC Cyclic Redundancy Check
CRS Common Reference Signal
CSI-RS Channel State Information Reference Signal
CSS Common Search Space
DCI Downlink Control Information
DL Downlink
DM-RS DeModulation Reference Signal
DTX Discontinuous Transmission
DwPTS Downlink Pilot Time Slot
eIMTA Enhanced Interference Mitigation and Traffic Adaptation (the name of the 3GPP WI targeting to flexible UL/DL adaptation for TD-LTE)
eNB enhanced Node B (base station according to LTE terminology)
EPDCCH Enhanced PDCCH
ETSI European Telecommunications Standards Institute
FFP Fixed Frame Period
HARQ Hybrid Automatic Repeat ReQuest
ISM Industrial, Scientific and Medical
LAA Licensed Assisted Access
L1 Layer 1, Physical Layer
LTE Long Term Evolution
LTE-U LTE Unlicensed
MBMS Multimedia Broadcast/Multicast Service
PCell Primary Cell
PDCCH Physical Downlink Control Channel
PMCH Physical Multicast Channel
PMI Precoding Matrix Indicator
PUCCH Physical Uplink Control Channel
PUSCH Physical Uplink Shared Channel
RAN Radio Access Network
Rel Release
RI Rank Indicator
RS Reference Signal
SCell Secondary Cell
SI Study Item
TBS Transport Block Size
TD, TDD Time Division duplex
TTI Transmission Time Interval
UCI Uplink Control Information
UL Uplink
USS User-specific Search Space
WG Working Group
WI Work Item
Wi-Fi a trademark name owned by WiFi Alliance. The Wi-Fi Alliance defines Wi-Fi as any "wireless local area network (WLAN) products that are based on the Institute of Electrical and Electronics Engineers' (IEEE) 802.11 standards".
WLAN Wireless Local Area Network
X2 X2 is an interface used to communication between eNBs
ARI Ack/Nack resource index

We claim:

1. A method, comprising:
operating a user equipment to follow a shortened transmission time interval, wherein the shortened transmission time interval is an integer number, L, of symbols in length; and
sending, in an uplink direction, a demodulation reference signal in at least a first symbol of the L symbols of the shortened transmission time interval, receiving, in a downlink direction, a dynamic indication to drop at least one demodulation reference signal from an uplink transmission, and dropping the at least one demodulation reference signal based on the indication, wherein the dropping the at least one demodulation reference signal based on the dynamic indication comprises:
the dropping the at least one demodulation reference signal further based on rules including that the user equipment has been scheduled in a previous shortened transmission time interval with a same or subset of previous resource allocations.

2. The method of claim 1, wherein the rules are known in advance by the user equipment and are configured to the user equipment by a network, specification, or manufacturer.

3. The method of claim 1, further comprising:
receiving the dynamic indication to operate in conjunction with or in supplement to the rules.

4. An apparatus, comprising:
at least one processor; and
at least one memory including computer program code,
wherein the at least one memory and the computer program code are configured to, with the at least one processor, cause the apparatus at least to
operate a user equipment to follow a shortened transmission time interval, wherein the shortened transmission time interval is an integer number, L, of symbols in length; and
sending, in an uplink direction, a demodulation reference signal in at least a first symbol of the L symbols of the shortened transmission time interval, receiving, in a downlink direction, a dynamic indication to drop at least one demodulation reference signal from an uplink transmission, and dropping the at least one demodulation reference signal based on the indication, wherein the dropping the at least one demodulation reference signal based on the dynamic indication comprises:

the dropping the at least one demodulation reference signal further based on rules including that the user equipment has been scheduled in a previous shortened transmission time interval with a same or subset of previous resource allocations.

5. The apparatus of claim 4, wherein the rules are known in advance by the user equipment and are configured to the user equipment by a network, specification, or manufacturer.

6. The apparatus of claim 4, wherein the at least one memory and the computer program code are configured to, with the at least one processor, cause the apparatus further to:

receive the dynamic indication to operate in conjunction with or in supplement to the rules.

7. A non-transitory computer readable medium comprising program instructions for causing an apparatus to perform at least:

operating a user equipment to follow a shortened transmission time interval, wherein the shortened transmission time interval is an integer number, L, of symbols in length; and sending, in an uplink direction, a demodulation reference signal in at least a first symbol of the L symbols of the shortened transmission time interval, receiving, in a downlink direction, a dynamic indication to drop at least one demodulation reference signal from an uplink transmission, and dropping the at least one demodulation reference signal based on the indication, wherein the dropping the at least one demodulation reference signal based on the dynamic indication comprises:

the dropping the at least one demodulation reference signal further based on rules including that the user equipment has been scheduled in a previous shortened transmission time interval with a same or subset of previous resource allocations.

\* \* \* \* \*